United States Patent [19]

Hirata et al.

[11] Patent Number: 5,211,070
[45] Date of Patent: May 18, 1993

[54] SPEED CONTROL SYSTEM FOR A VEHICLE HAVING A BRAKING DEVICE AND A STEPLESS TRANSMISSION

[75] Inventors: Kazuo Hirata; Taichi Fujiwara, both of Sakai, Japan

[73] Assignee: Kubota Corporation, Osaka, Japan

[21] Appl. No.: 832,976

[22] Filed: Feb. 10, 1992

[30] Foreign Application Priority Data

Jun. 13, 1991 [JP] Japan .................. 3-141562
Sep. 24, 1991 [JP] Japan .................. 3-242300

[51] Int. Cl.$^5$ .............................. G05G 11/00
[52] U.S. Cl. ........................ 74/477; 74/473 R; 74/474; 74/480 R; 74/483 R
[58] Field of Search .......... 74/473 R, 474, 477, 74/479, 480 R, 481, 483 R

[56] References Cited

U.S. PATENT DOCUMENTS

| | | | |
|---|---|---|---|
| 3,645,368 | 2/1972 | Blaauw | 74/481 X |
| 3,898,891 | 8/1975 | Colloton | 74/481 X |
| 4,341,129 | 7/1982 | Bando | 74/474 X |
| 4,346,617 | 8/1982 | Schroeder et al. | 74/481 |
| 4,958,535 | 9/1990 | Swartzendruber | 74/481 |
| 5,062,510 | 11/1991 | Shimizu | 74/481 X |

FOREIGN PATENT DOCUMENTS 56-19124 2/1981 Japan .................. 74/474

*Primary Examiner*—Allan D. Herrmann
*Assistant Examiner*—William O. Trousdell
*Attorney, Agent, or Firm*—Webb, Burden, Ziesenheim & Webb

[57] ABSTRACT

A speed control system for a vehicle having a braking device and a stepless transmission. A change speed member for controlling the stepless transmission is shiftable between a forward drive zone and a backward drive zone across a neutral position. The change speed member is urged to the neutral position, and operatively connected to a change speed pedal and a shift lever. The shift lever is lockable to a selected shift position. Switching may be made between a connection enable state for enabling connection between a first interlocking member connected to the change speed member and a second interlocking member connected to the shift lever, and a connection prohibit state for prohibiting the connection between the first interlocking member and second interlocking member.

The connection between the first interlocking member and second interlocking member is canceled with operation of the braking device. When the connection enable state is set, the first interlocking member and second interlocking member are connected to each other by shifting of the change speed pedal after the operation of the braking device, to reinstate a vehicle speed corresponding to a shift position of the shift lever selected prior to the operation of the braking device.

14 Claims, 11 Drawing Sheets

SPEED CONTROL SYSTEM FOR A VEHICLE HAVING A BRAKING DEVICE AND A STEPLESS TRANSMISSION

BACKGROUND OF THE INVENTION

1. Field of the Invention

The present invention relates to a speed control system for a vehicle having a braking device and a stepless transmission, particularly a hydrostatic transmission.

2. Description of the Related Art

A working vehicle having a stepless transmission, e.g. an HST (hydrostatic transmission) as a change speed device includes a foot-operated change speed pedal for controlling the HST, and a shift lever for manually operating the change speed pedal, as disclosed in Japanese Patent Publication Kokai No. 1989-190553. Generally, such a vehicle also includes a lock mechanism for maintaining the shift lever in a selected position. The vehicle can run at a constant speed, i.e. make a cruising run, when the driver's foot is removed from the change speed pedal after operating the shift lever to set the change speed pedal to a selected forward speed position and retaining the shift lever in the corresponding position by means of the lock mechanism.

The retaining action of the lock mechanism is canceled when a brake pedal is depressed during the constant speed run as above. Then, the HST and shift lever are returned to neutral position by an urging spring acting on the HST, and the brakes are applied at the same time.

In the above speed control system, not only the HST but the shift lever returns to neutral when the brake pedal is depressed during a cruising run at the constant speed with the lock mechanism in operation. In order to resume the constant speed run after depressing the brake pedal, therefore, the driver must operate the shift lever back to the position corresponding to the constant speed.

The driver operates the shift lever to set a desired running speed while looking ahead. In this case, the driver does not correctly grasp the position to which the shift lever should be operated. It is therefore difficult to set the shift lever to the previous position correctly. To cope with this difficulty, the driver must confirm positions of the shift lever whenever the shift lever is operated. This operation, though temporarily, distracts the driver's attention from a forward view, which is undesirable for the purpose of driving.

SUMMARY OF THE INVENTION

The object of the present invention is to provide a speed control system for correctly reinstating a previously selected constant speed without a burden imposed on the driver, after the vehicle is braked during a cruising run to return the stepless transmission to neutral.

The above object is fulfilled, according to the present invention, by a speed control system for a vehicle having a braking device and a stepless transmission, comprising:

a change speed member mounted in the stepless transmission to be shiftable between a forward drive zone and a backward drive zone across a neutral position;

neutralizing means for urging the change speed member to the neutral position;

a change speed pedal operatively connected to the change speed member;

a shift lever shiftable between a first shift position and a second shift position and lockable to a selected shift position; and interlocking means for operatively interconnecting the change speed member and the shift lever, the interlocking means including:

a first interlocking member connected to the change speed member, a second interlocking member connected to the shift lever and maintaining a position corresponding to the selected shift position of the shift lever, connecting means operatively connected to the braking device, and having a connection enable state for enabling connection between the first interlocking member and the second interlocking member, and a connection prohibit state for prohibiting the connection between the first interlocking member and the second interlocking member, the connecting means being movable to the connection prohibit state with operation of the braking device, and auto return means for automatically returning the connecting means to the connection enable state after the operation of the braking device;

the first interlocking member, when disconnected from the second interlocking member, being connectable to the second interlocking member by shifting of the change speed pedal.

According to the above speed control system, when a brake pedal is depressed while the vehicle is making a cruising run at a constant speed with the shift lever maintained in a selected position, the connection between the change speed member of the stepless transmission and the shift lever is canceled by action of the interlocking means connecting the shift lever and the change speed member. With this disconnection, the change speed member and change speed pedal are returned to neutral by the neutralizing means, whereby the stepless transmission becomes neutral. On the other hand, the shift lever remains locked to the selected position.

When the change speed pedal in neutral is operated for acceleration, i.e. when the change speed member of the stepless transmission is operated in a direction to accelerate the vehicle, after the operation of the brake pedal as above, the change speed member and shift lever are interconnected again by the interlocking means. The interlocking means includes a first interlocking member connected to the change speed member, a second interlocking member connected to the shift lever, and connecting means for interconnecting the first and second interlocking members. The second interlocking member maintains a position corresponding to the shift position of the shift lever. Consequently, when the first and second interlocking members are interconnected by the connecting means, the stepless transmission is shifted to a position corresponding to the shift position of the shift lever. This enables the vehicle to return to the cruising run at the constant speed selected previously.

When returning to the cruising run as above, the driver need not look at the shift lever, but may just operate the change speed pedal while looking ahead. The driver may remove his or her foot from the change speed pedal upon connection between the first and second interlocking members of the interlocking means.

Thus, the cruising run at the selected constant speed may be correctly repeated over and over again despite the operation of the brake pedal. This feature promotes operability of the working vehicle as well.

In a preferred embodiment of the present invention, the speed control system advantageously further includes a control member for prohibiting the change speed member and shift lever from being connected together again by operation of the change speed pedal after cancellation of the connection therebetween, i.e. cancellation of the connection between the first and second interlocking members, based on the braking operation. When the control member is set to prohibit the reconnection, the first and second interlocking members do not return to the connected state, leaving the interlocking between the shift lever and the change speed member of the stepless transmission broken, even if the change speed pedal is operated from the neutral position to increase the speed after the operation of the brake pedal. This connection prohibit state is selected in situations where reinstatement of the change speed pedal in a previous shift position is inconvenient. Such situations include a case of using the vehicle in an operation requiring delicate speed controls to move the vehicle among obstacles such as trees and rocks following an operation of the brake pedal, and a case of moving the vehicle from one working site to another by running along a road.

Other features and advantages of the present invention will be apparent from the following description of the preferred embodiments to be had with reference to the drawings.

DETAILED DESCRIPTION OF THE PREFERRED EMBODIMENTS

First Embodiment

Figure 1:
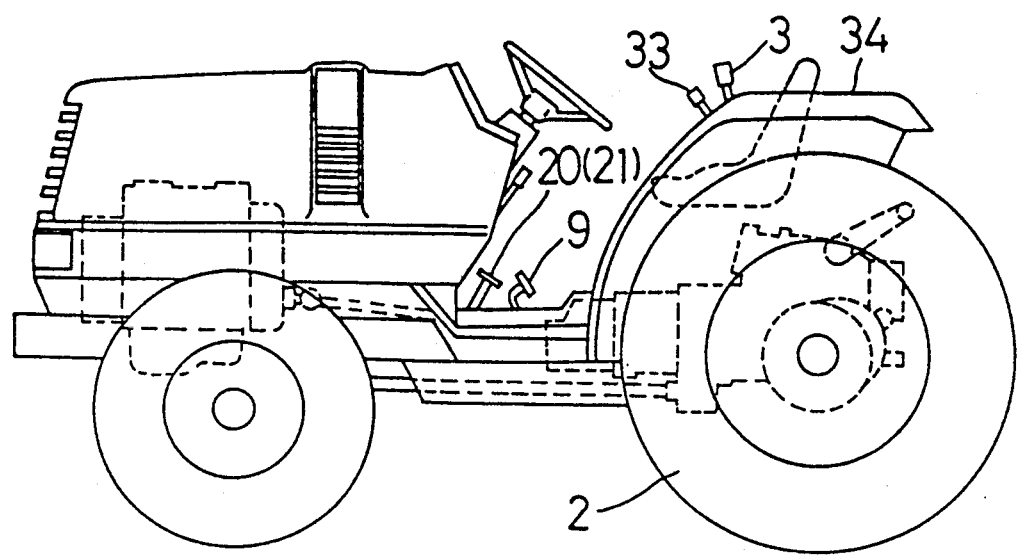
FIG. 1 is a side elevation of a tractor employing a speed control system according to the present invention.
Figure 2:
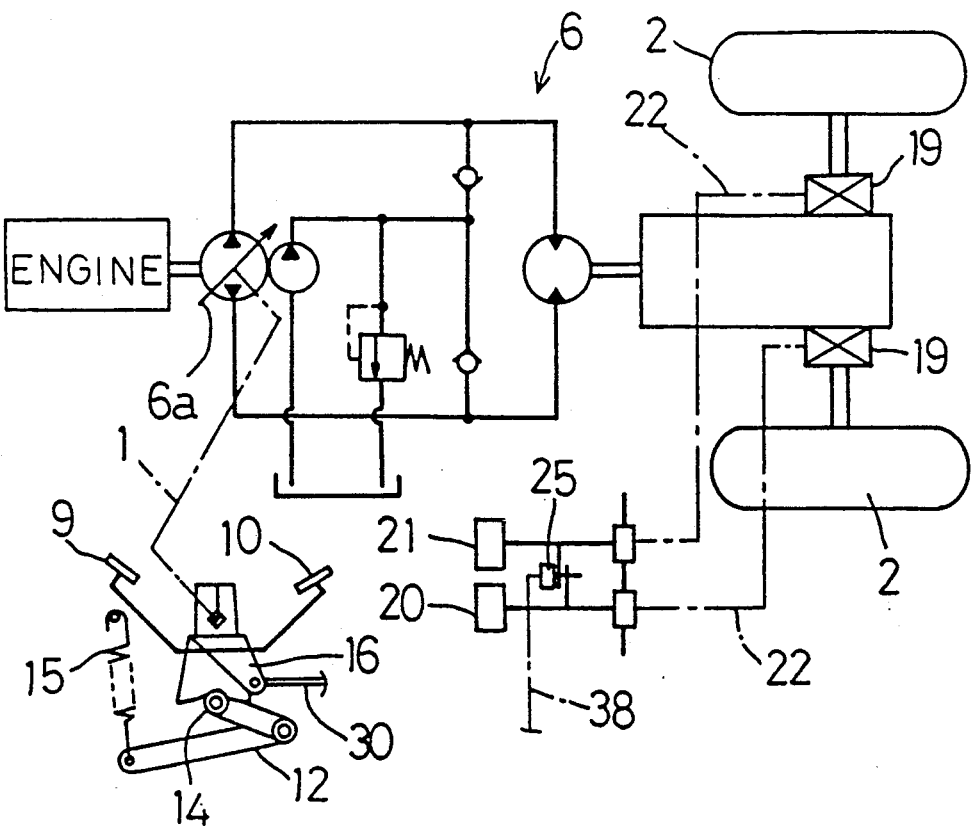
FIG. 2 is a schematic view showing interlocking among a hydrostatic stepless transmission, forward and backward change speed pedals and brake pedals of the tractor shown in FIG. 1.

FIG. 1 shows a tractor employing a speed control system according to the present invention. FIG. 2 shows a drive transmission system of the tractor including a hydrostatic transmission 6. The way this HST 6 is controlled will be described first. As shown in FIGS. 1 and 2, and HST control unit 16 having a forward change speed pedal 9 and a backward change speed pedal 10 is mechanically interlocked with a swash plate 6a of the HST 6 through a control shaft 1. When the forward change speed pedal 9 or backward change speed pedal 10 is depressed, the HST 6 is operable to provide high forward or backward speeds.

As shown in FIG. 2, an L-shaped control arm 12 is supported to be pivotable vertically on the sheet of drawings. The control arm 12 carries a roller 14 mounted at one end thereof and pressed on a recess of the control unit 16 from below. A spring 15 urges the control arm 12 upward on the sheet of drawings, whereby the control unit 16, and thus the swash plate 6a of HST 6, are urged to neutral position.

Figure 3:
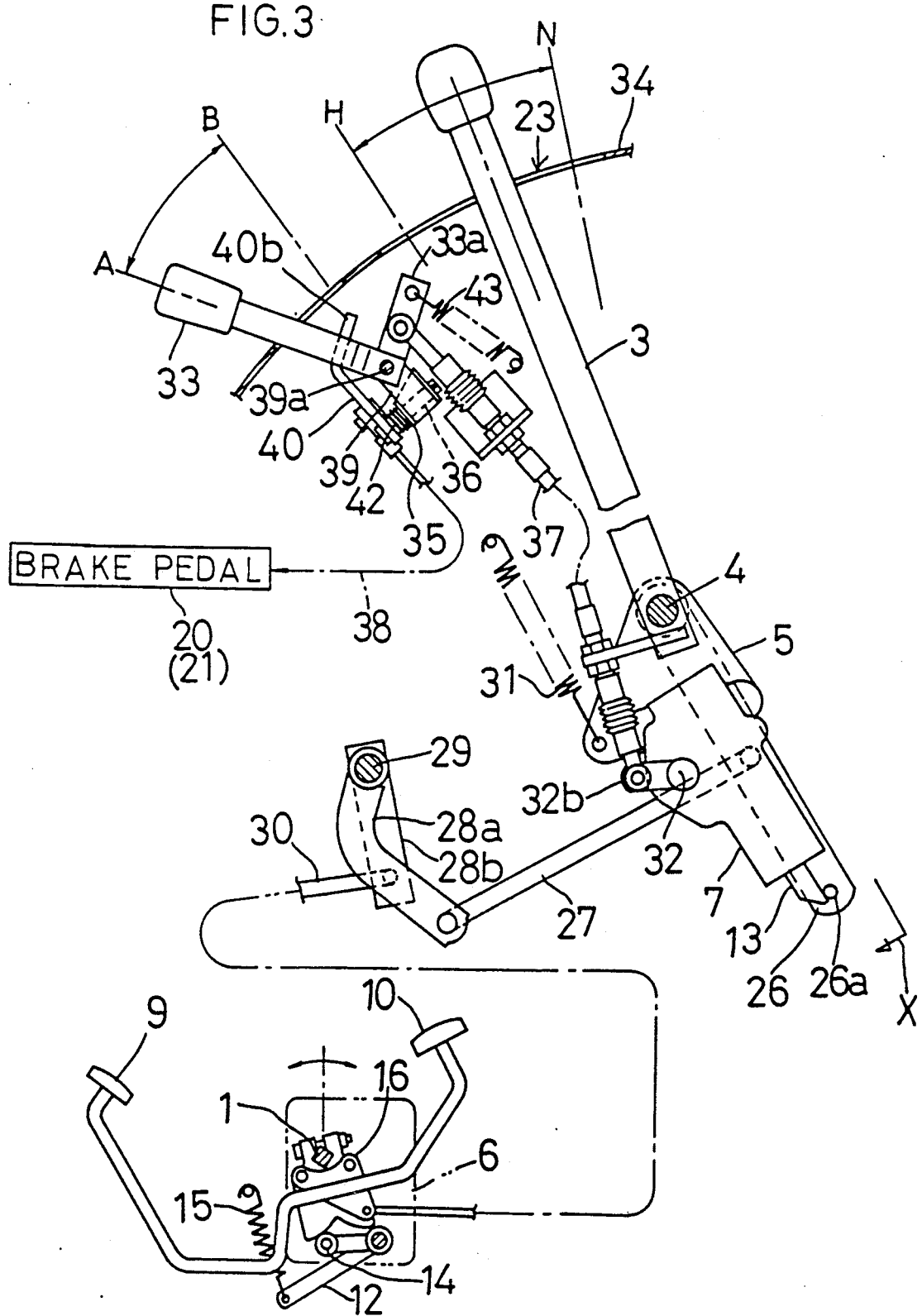
FIG. 3 is a side view of a shift lever, a switch lever, a first control arm, a first interlocking arm and an engaging pin forming part of a speed control system in a first embodiment of the present invention, in which these components are in a state to provide a cruising speed.
Figure 4:
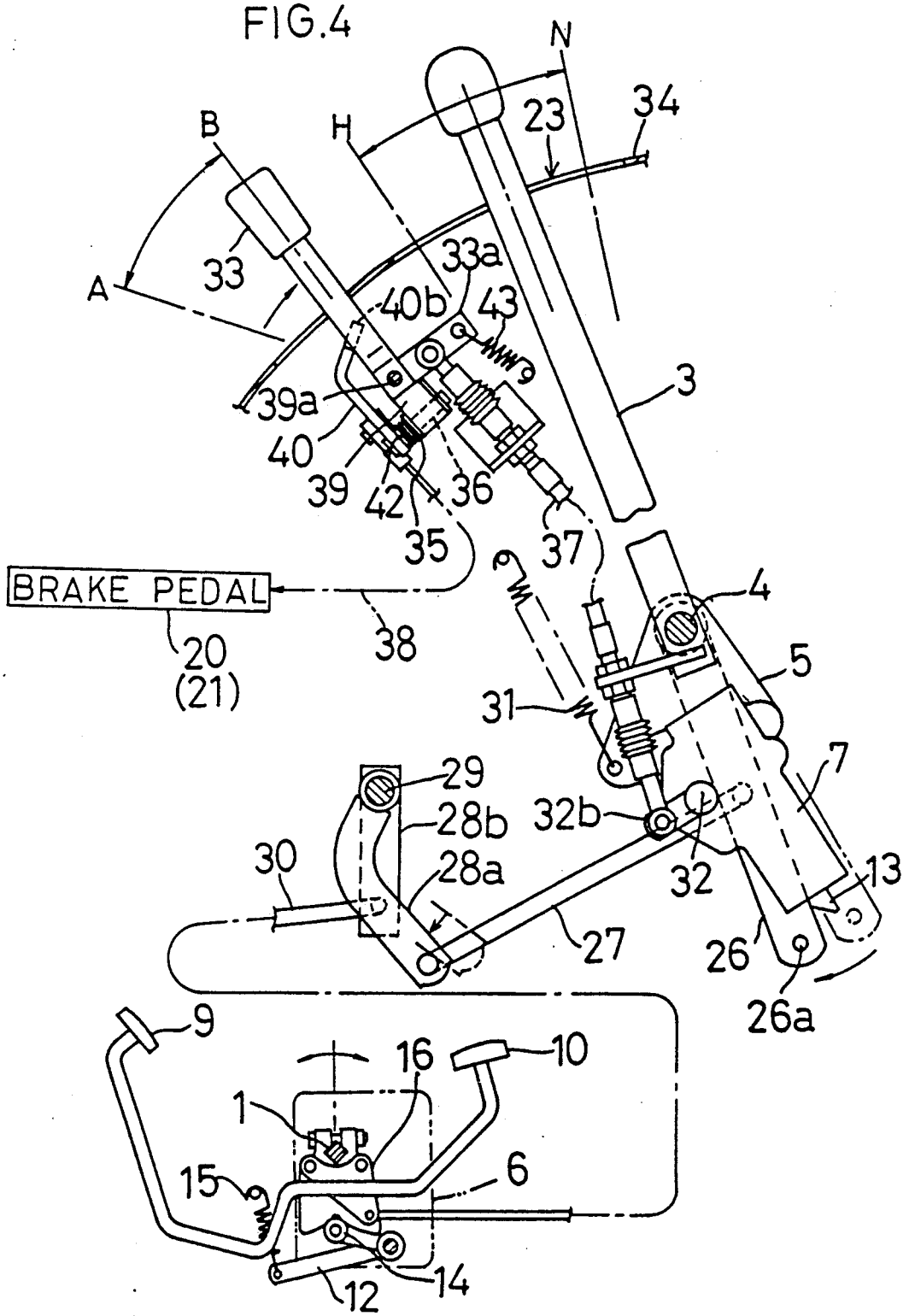
FIG. 4 is a side view similar to FIG. 3 and showing a state in which the hydrostatic stepless transmission is returned to neutral with the brake pedals depressed and the switch lever operated to a non-lock position.
Figure 5:
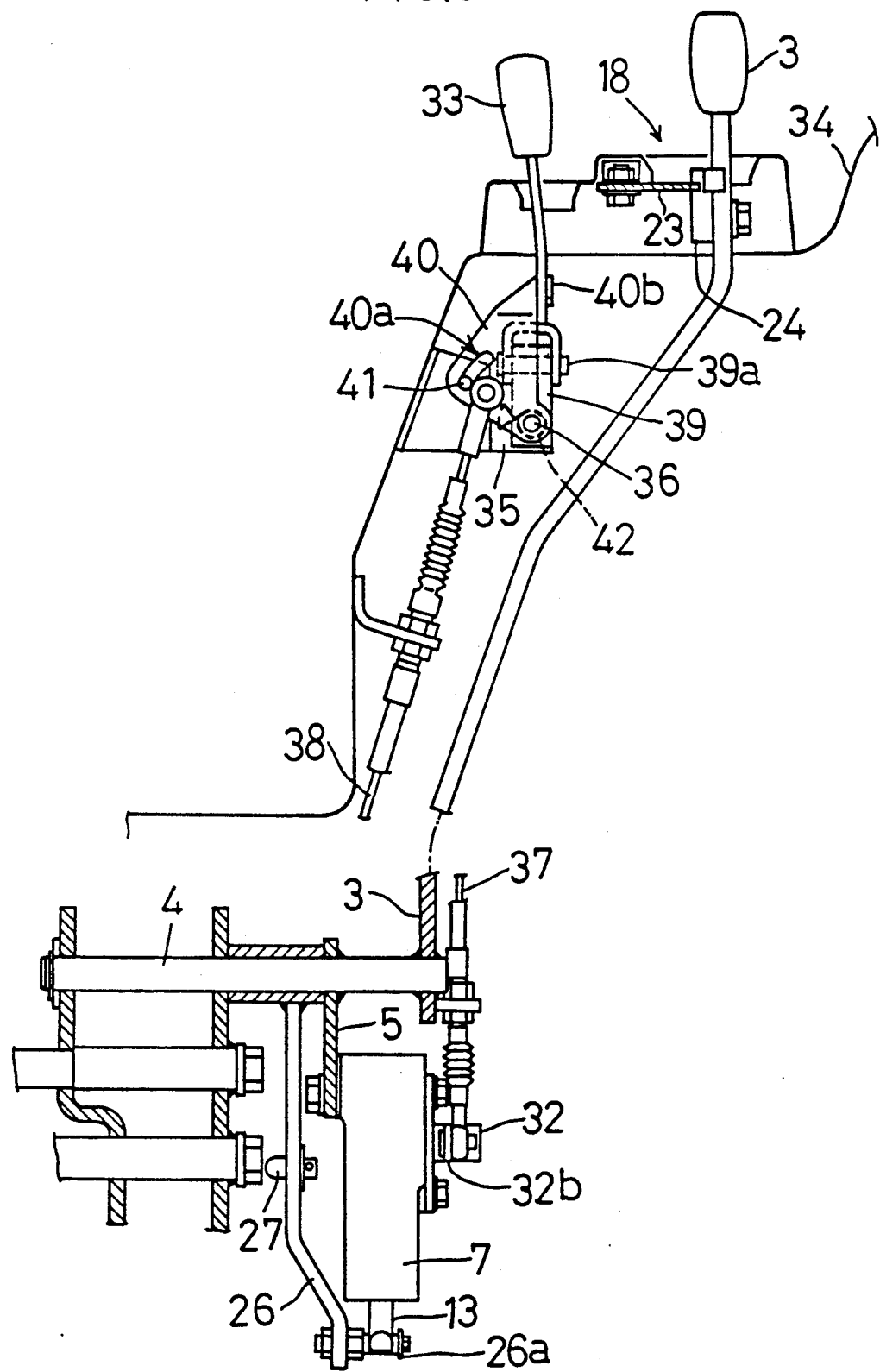
FIG. 5 is a front view seen in the direction of arrow X of FIG. 3.

This tractor includes a shift lever 3 besides the forward and backward change speed pedals 9 and 10. An interlocking structure between the shift lever 3 and HST 6 will be described next. Referring to FIGS. 3 through 5, a support shaft 4 is rotatably supported on a stationary section rearwardly of the tractor. The shift lever 3 which is formed of a plate spring is fixed to one end of the support shaft 4. The support shaft 4 further supports an interlocking plate 5 fixed thereto, and a support case 7 is fixed to the interlocking plate 5. A spring 31 is attached to the interlocking plate 5 for urging the shift lever 3 to neutral position N.

Figure 6:
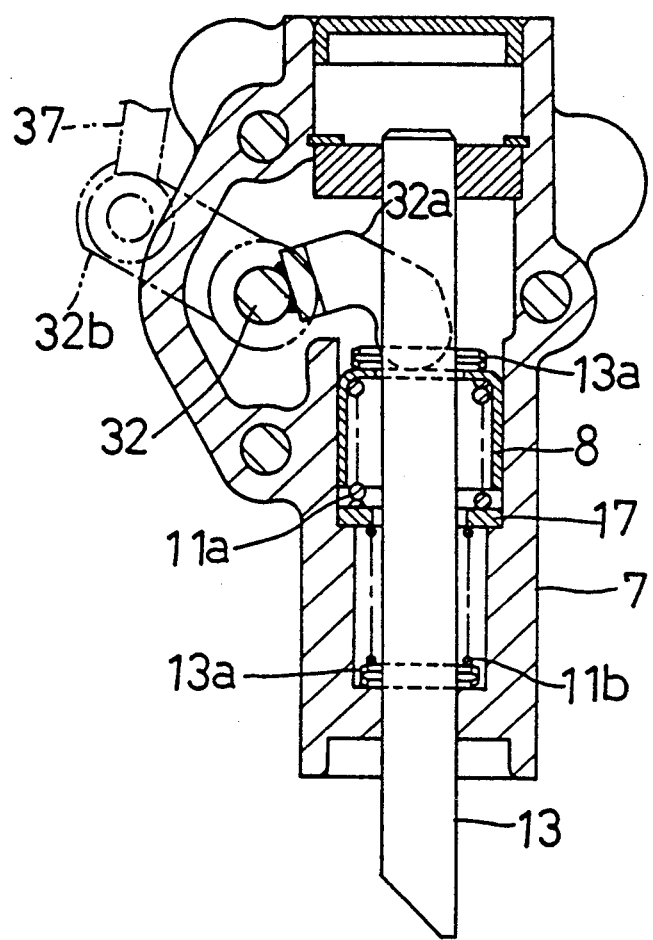
FIG. 6 is a side view in vertical section of a support case containing an engaging pin.
Figure 7:
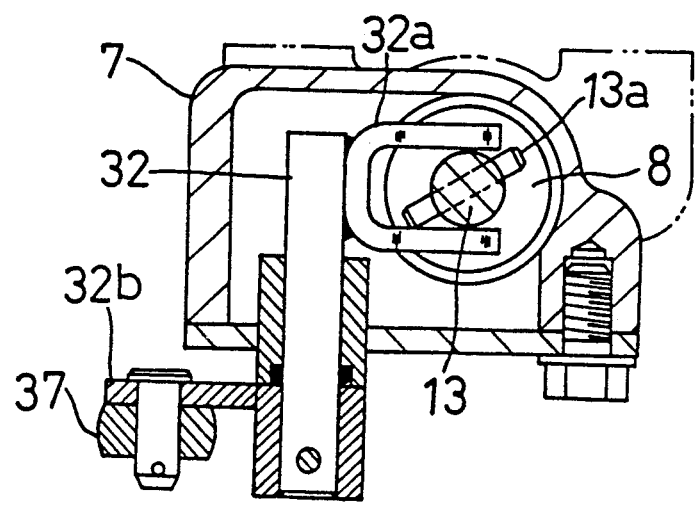
FIG. 7 is a plan view in cross section of the support case.

As shown in FIGS. 3 and 6, the support case 7 slidably supports therein an engaging pin 13 having an obliquely cut extreme end. The engaging pin 13 fixedly carries a pair of pins 13a spaced apart from each other axially of the engaging pin 13 and radially penetrating the engaging pin 13. Between the pins 13a are a cylindrical member 8, a strong urging spring 11a, a ring 17 and a weak urging spring 11b. Further, a control shaft 32 is rotatably supported by the support case 7. As shown in FIGS. 6 and 7, the control shaft 32 fixedly carries a bifurcated first arm 32a for contacting an upper end of the cylindrical member 8. In the state shown in FIG. 6, the control shaft 32 is fixed after having been rotated clockwise in the drawing by a switch lever 33 described later, with the engaging pin 13 pushed downward by the first arm 32a.

As shown in FIGS. 3 and 5, an interlocking arm 26 is attached to the support shaft 4 to be pivotable relative thereto. The interlocking arm 26 is operatively connected to the HST control unit 16 through an interlocking rod 27, a first link 28a, a second link 28b, an interlocking shaft 29 and an interlocking rod 30. The interlocking arm 26 includes an engaging projection 26a at a distal end thereof for contacting the engaging pin 13 projecting downward.

It will be understood that the above structure provides a drivable connection between the interlocking arm 26 and interlocking plate 5 through the engaging pin 13.

The interlocking arm 26 and related components are urged leftward in FIG. 3 by the force urging the control arm 12 to neutral. In the state shown in FIG. 3, the shift lever 3 is operated for a forward speed, with the engaging projection 26a of the interlocking arm 26 contacting the engaging pin 13 from the righthand side in the drawing. When, in this state, the shift lever 3 is operated in a direction to provide a high forward speed H, the engaging pin 13 pushes the engaging projection 26a, thereby operating the control unit 16 and swash plate 6a to provide the high forward speed. When the shift lever 3 is operated to provide a low forward speed (i.e. toward neutral position N), the control unit 16 and swash plate 6a are operated to provide the low forward speed under the force urging the control arm 12 to neutral. The shift lever 3 is operable only to select forward speeds, and backward speeds are not controllable by the shift lever 3.

Figure 8:
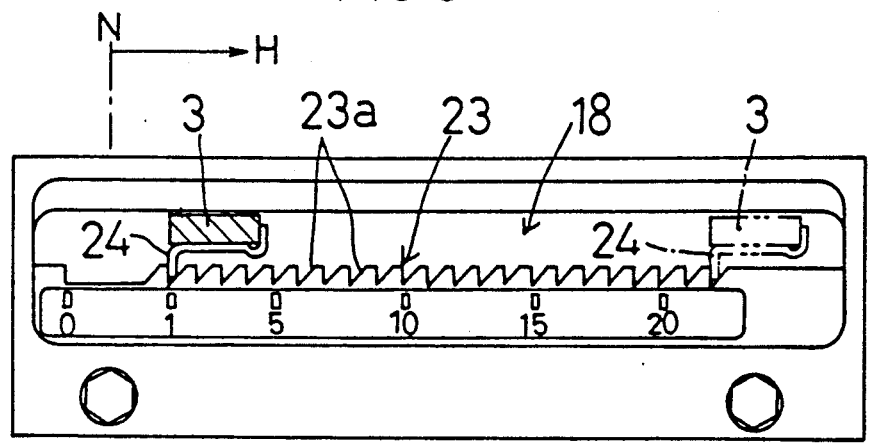
FIG. 8 is a plan view of a lever guide and lock guide for guiding the shift lever.

A locking structure for maintaining the shift lever 3 in a selected forward speed position will be described next. Referring to FIGS. 1 and 8, a fender 34 of a rear wheel 2 (FIG. 1) includes a lever guide 18 for guiding the shift lever 3. The lever guide 18 has a lock guide 23 extending along the lever guide 18 and including a plurality of engaging recesses 23a. The shift lever 3 includes a hook 24 fixed thereto which is formed by bending a thin plate spring.

According to the above structure, when the shift lever 3 is operated from neutral position N in the direction to provide high forward speed H, the hook 24 automatically engages one of the recesses 23a of the lock guide 23 to maintain the shift lever 3 in a selected forward speed position. The tractor will then run at a constant speed corresponding to this position. The shift lever 3 may be returned to the neutral position N by disengaging the lever 3 formed of a plate spring from the lock guide 23.

When the shift lever 3 is operated in the direction to provide high forward speed H, the HST 6 is operated to provide the high forward speed through the contact between the engaging projection 26a and the engaging pin 13 projecting downward as shown in FIG. 3. Even if the driver releases the shift lever 3 in a selected speed position, the shift lever 3 is retained in that position by the retaining action of the lock guide 23, whereby the tractor moves forward at a constant speed corresponding to the position of the shift lever 3. When the forward change speed pedal 9 is depressed, the first interlocking arm 26 is moved away from the interlocking plate 5 to enable acceleration from the above constant speed. Once the driver's foot is removed from the forward change speed pedal 9, the first interlocking arm 26 moves to the interlocking plate 5 to reinstate the above constant speed.

A relationship between the switch lever 33 and engaging pin 13 will be described next. As shown in FIGS. 3 and 5, a support block 39 is pivotably supported on a pin 36 of a bracket 35 fixed to the fender 34. The switch lever 33 is pivotably supported on a pin 39a of the support block 39. The switch lever 33 has an arm 33a fixed thereto and connected through a wire 37 to a second arm 32b of the control shaft 32 on the support case 7.

Figure 9:
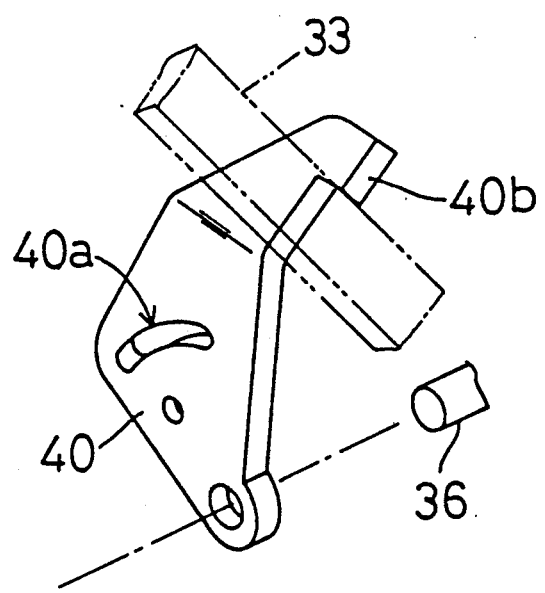
FIG. 9 is a perspective view of a lock plate for locking the switch lever.

As shown in FIGS. 3, 5 and 9, a lock plate 40 bent into an L-shape is fixed to one end of the pin 36. The lock plate 40 defines an arcuate slot 40a for receiving a pin 41 fixed to the fender 34, whereby the lock plate 40 is pivotable through a range of the slot 40a. A helical spring 42 is provided to urge the lock plate 40 clockwise in FIG. 5, i.e. toward the switch lever 33. As shown in FIG. 3, a spring 43 is obliquely attached to the arm 33a of the switch lever 33. Consequently, the switch lever 33 is urged by the spring 43 toward the lock plate 40 in FIG. 5, and clockwise in FIG. 3.

In the state shown in FIGS. 3, 5 and 9, the switch lever 33 lies in a lock position A (auto return position), and is retained in the lock position A contacting a projecting portion 40b of the lock plate 40. In this state, the wire 37 is pulled toward the switch lever 33, protruding the engaging pin 13 downward as shown in FIG. 3, thereby enabling the tractor to run at a constant speed corresponding to a position of the shift lever 3.

A relationship between the switch lever 33 and side brakes 19 will be described next. As shown in FIGS. 1 and 2, two side brakes 19 are provided for independently braking right and left rear wheels 2. Right and left brake pedals 20 and 21 are pivotably juxtaposed in a driver's section of the tractor, and operatively connected to the right and left side brakes 19 through interlocking rods 22, respectively. A control element 25 is provided which is pushed only when the two brake pedals 20 and 21 are depressed at the same time. This control element 25 is connected through a wire 38 to the lock plate 40 shown in FIG. 5.

Figure 10:
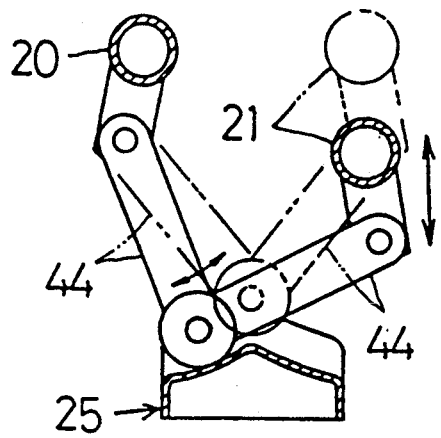
FIG. 10 is a front view of the brake pedals, a linkage interconnecting the brake pedals, and a control element.
Figure 11:
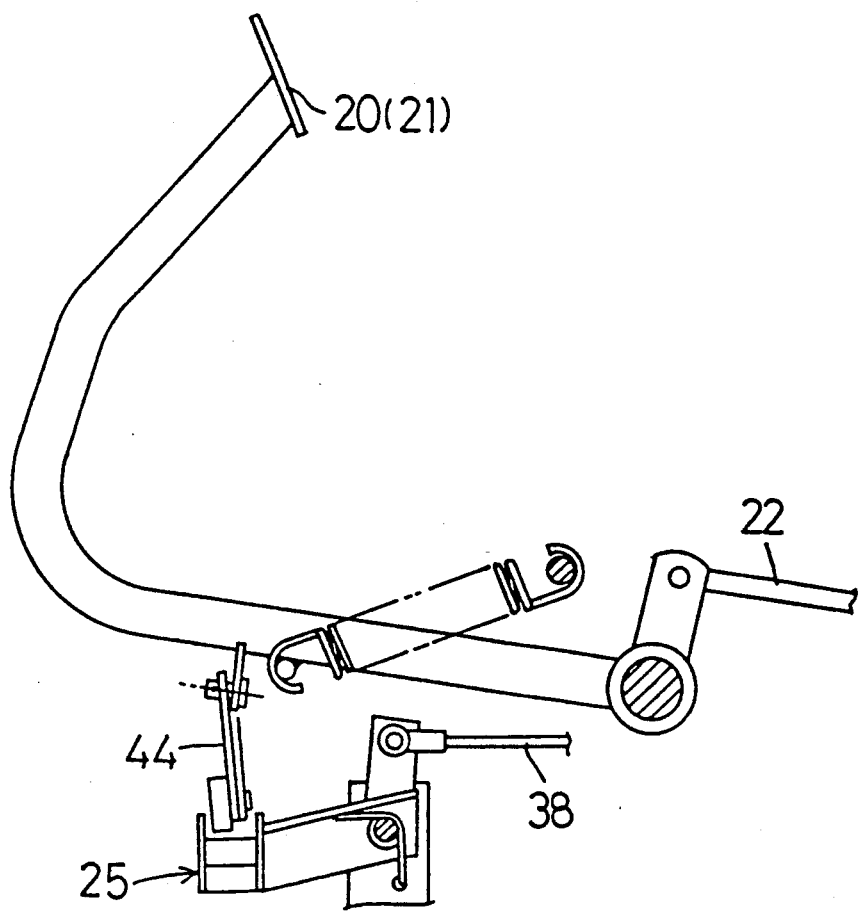
FIG. 11 is a side view of the brake pedals, linkage and control element.

Assume that one of the brake pedals 21 is depressed for causing the tractor to make a small, sharp turn, for example, while running at a constant speed with the shift lever 3 maintained in a selected forward speed position as shown in FIG. 3. In this case, as shown in FIGS. 10 and 11, a linkage 44 interconnecting the two brake pedals 20 and 21 escapes right or left without pushing the control element 25. Consequently, the lock plate 40 remains out of operation to maintain the constant speed.

Assume now that both of the brake pedals 20 and 21 are depressed at the same time to stop the tractor, for example. In this case, the linkage 44 is lowered directly to push the control element 25. As a result, the wire 38 is pulled to move the lock plate 40 leftward in FIG. 5 out of engagement with the switch lever 33. Then, as shown in FIG. 4, the switch lever 33 moves to a nonlock position B (auto return disable position) under the urging force of spring 43, and the engaging pin 13 retracts into the support case 7 under the urging force of spring 11a (FIG. 6).

Since the engaging pin 13 is thereby separated from the engaging projection 26a, the swash plate 6a of HST 6 returns to the neutral position under the force urging the control arm 12 to neutral. As shown in FIG. 4, the interlocking arm 26 moves leftward away from the interlocking plate 5. Thus, when the right and left brake pedals 20 and 21 are both depressed, the HST 6 returns to the neutral position but the shift lever 3 remains in the position retained by the lock guide 23.

In this state, the interlock between the shift lever 3 and HST 6 is broken since the engaging pin 13 is retracted inside the support case 7, whereby the HST 6 is freely controllable through the forward and backward change speed pedals 9 and 10. Even if the forward change speed pedal 9 is depressed to increase the forward speed, the engaging pin 13 and engaging projection 26a remain out of contact. Thus, there occurs no return to the previous constant speed run.

When the driver desires to reinstate the previous constant speed run after depressing both the right and left brake pedals 20 and 21, he or she may operate the switch lever 33 from the non-lock position B shown in FIG. 4 back to the lock position A (FIG. 3). Then, the engaging pin 13 is protruded from the support case 7 (with the shift lever 3 remaining in the same position as before depression of the brake pedals 20 and 21).

In this state, the driver may depress the forward change speed pedal 9 to increase the speed. Then, as shown in FIG. 4, the interlocking arm 26 lying leftward away from the engaging pin 13 is operated rightward toward the engaging pin 13. When the engaging projection 26a contacts the engaging pin 13 supported in the support case 5, the engaging pin 13 is pushed upward, compressing the spring 11b shown in FIG. 6. The engaging pin 13 projects downward again after passage of the engaging projection 26a.

When the forward change speed pedal 9 is released in this state, the engaging projection 26a contacts the engaging pin 13 as shown in FIG. 3, to connect the interlocking arm 26 to the interlocking plate 5. As a result, the forward change speed pedal 9 and the swash plate 6a of HST 6 are set to the position corresponding to the previous constant speed (the speed corresponding to the position of the shift lever 3), to reinstate the previous constant speed run.

Second Embodiment

A second embodiment of the present invention will be described next. The most salient difference between the first and second embodiments is that the second embodiment does not include the switch lever 33 for enabling and prohibiting the connection between the interlocking plate 5 and interlocking arm 26.

This speed control system also includes a shift lever 103 besides the forward and backward change speed pedals 9 and 10. An interlocking structure between the shift lever 103 and HST 6 will be described.

Figure 12:
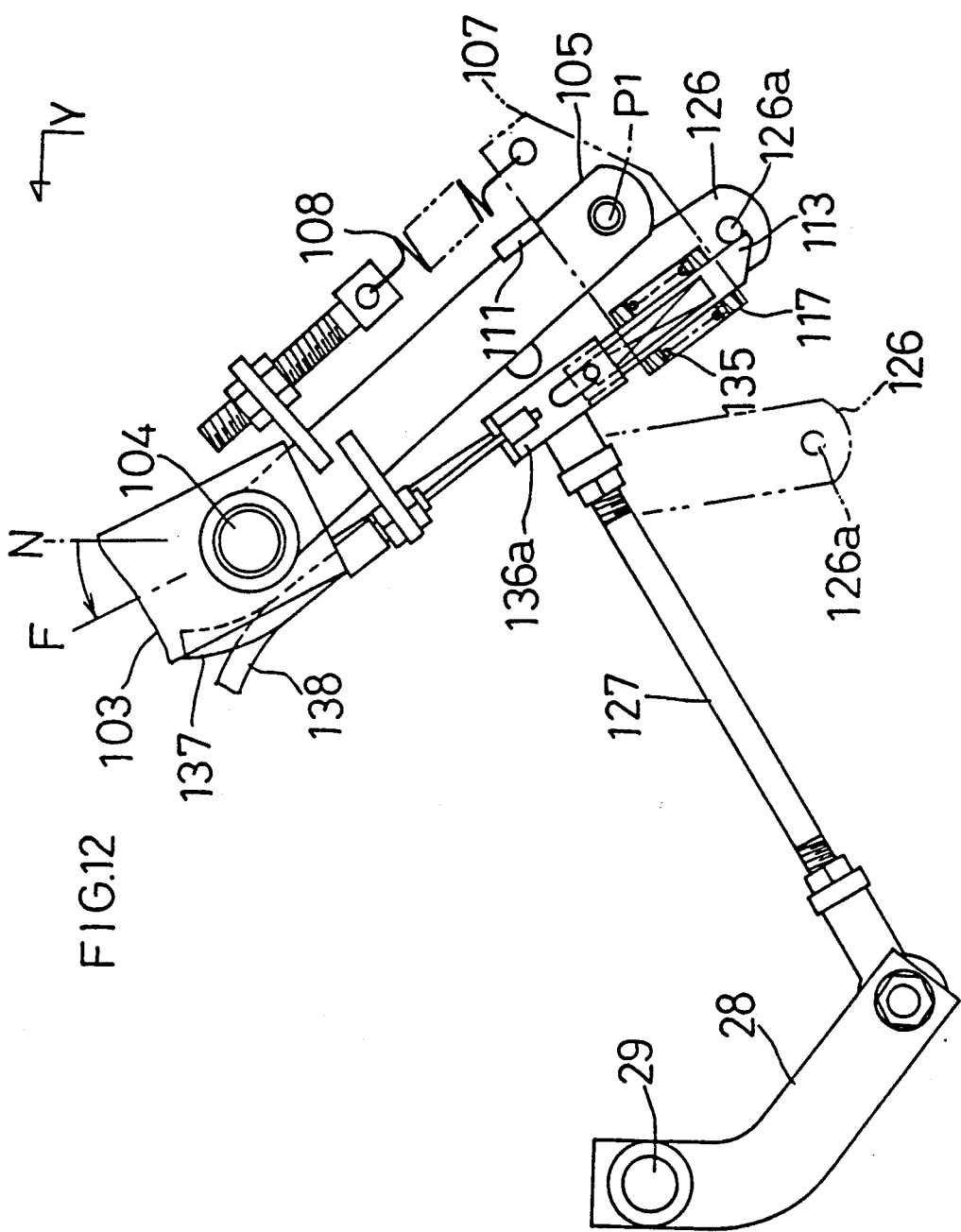
FIG. 12 is a fragmentary side view of a speed control system in a second embodiment of the present invention.
Figure 13:
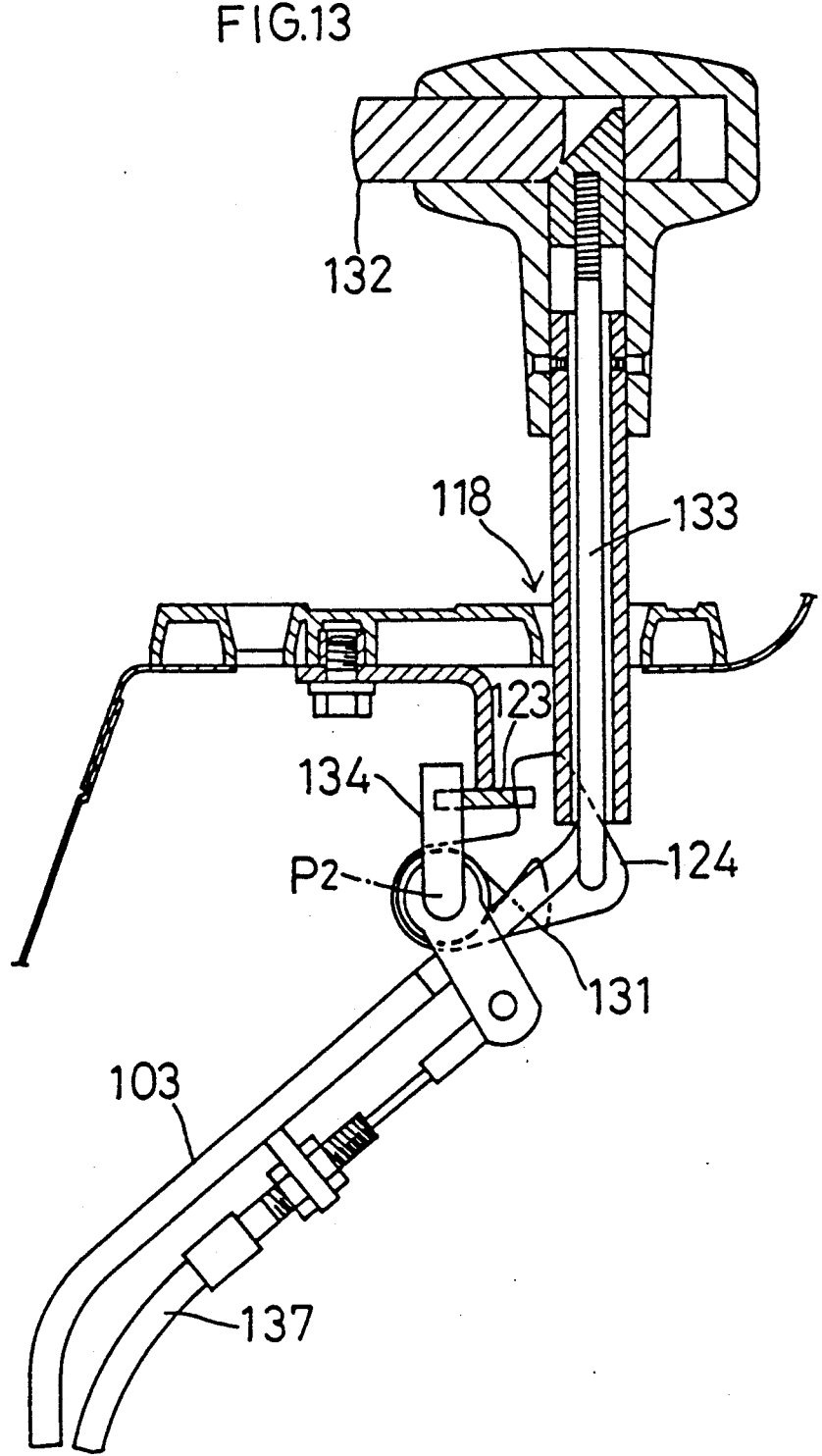
FIG. 13 is a front view of a shift lever and adjacent components of the second embodiment.
Figure 14:
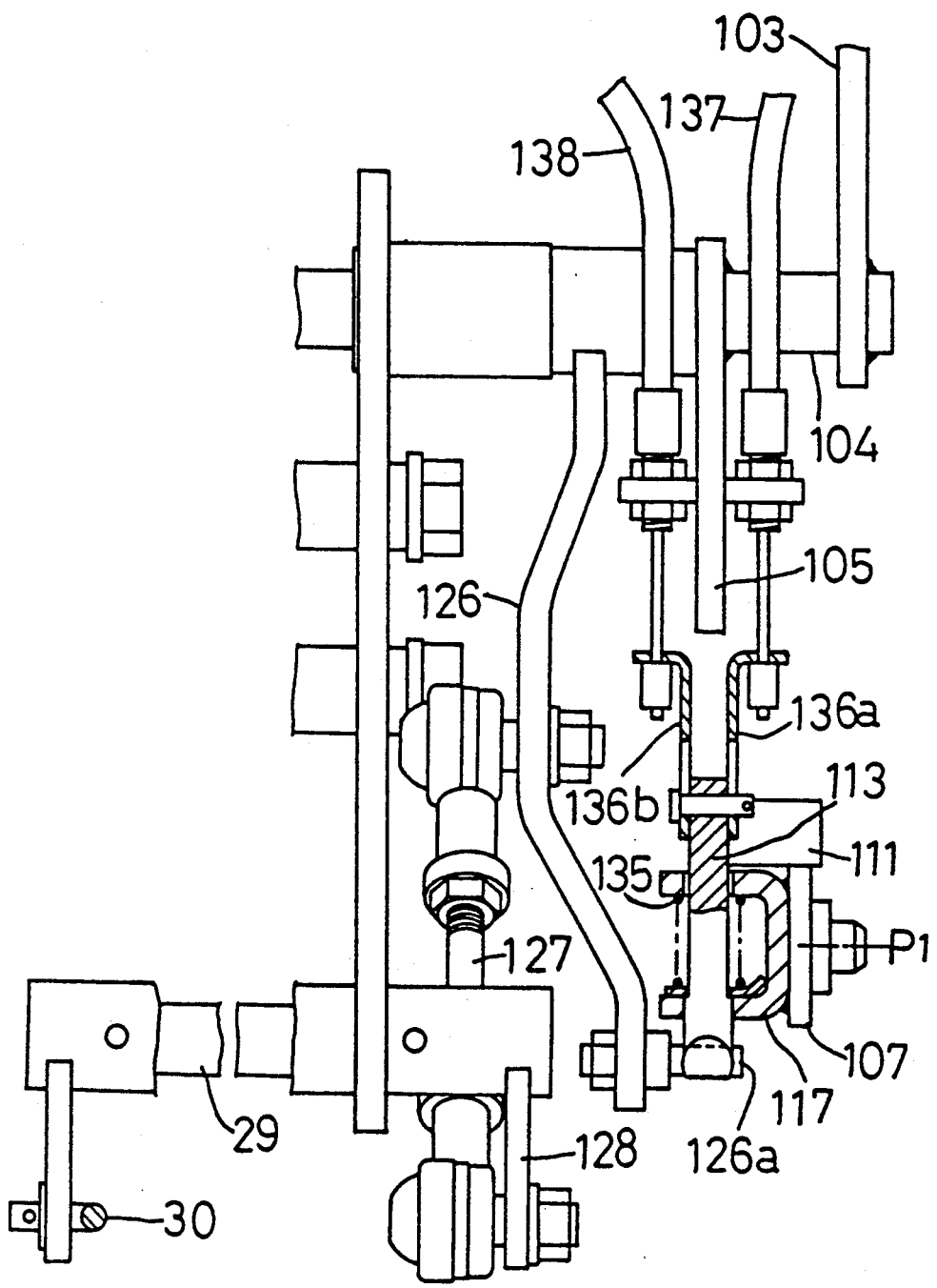
FIG. 14 is a front view partly in section and seen in the direction of arrow Y of FIG. 12.

Referring to FIGS. 12 through 14, a support shaft 104 is rotatably supported on a stationary section rearwardly of the tractor. The shift lever 103 is fixed to one end of the support shaft 104. The support shaft 104 further supports an interlocking plate 105 fixed thereto, and a bracket arm 107 is supported to be pivotable about an axis P1 at an extreme end of the interlocking plate 105. The interlocking plate 105 includes a spring 108 for urging the bracket arm 107 counterclockwise in FIG. 12, and a stopper 111 for stopping the bracket arm 107 at a position as shown in FIG. 12. The bracket arm 107 has a bracket 117 supporting therein an engaging pin 113 having an obliquely cut extreme end.

As shown in FIGS. 12 and 14, an interlocking arm 126 is attached to the support shaft 104 to be pivotable relative thereto. As shown in FIGS. 12 and 14 and FIG. 2, the interlocking arm 126 is operatively connected to the HST control unit 16 through an interlocking rod 127, and through the link 28, interlocking shaft 29 and interlocking rod 30 as in the first embodiment.

As described with reference to FIG. 2, the interlocking arm 126 and related components are urged leftward in FIG. 12 by the force urging the control arm 12 to neutral. In the state shown in FIG. 12, the shift lever 103 is operated to a forward speed position, with an engaging projection 126a of the interlocking arm 126 contacting the engaging pin 113 from the righthand side in the drawing. When, in this state, the shift lever 103 is operated to provide a high forward speed (leftward in FIG. 12), the engaging pin 113 pushes the engaging projection 126a, thereby operating the HST control unit 16 and swash plate 6a to provide the high forward speed. When the shift lever 103 is operated to provide a low forward speed (i.e. rightward in FIG. 12), the swash plate 6a of HST 6 is operated to provide the low forward speed under the force urging the control arm 12 to neutral. The shift lever 103 is operable only to select forward speeds, and backward speeds are not controllable by the shift lever 103.

Figure 15:
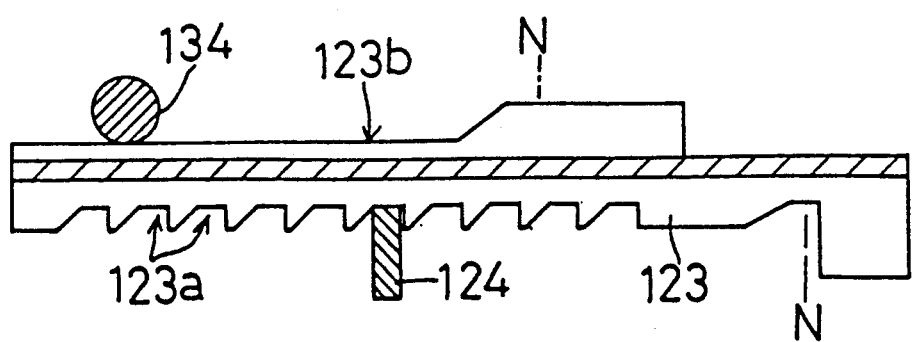
FIG. 15 is a plan view of a lock guide in the second embodiment.

A locking structure for maintaining the shift lever 103 in a selected forward speed position will be described next. Referring to FIGS. 13 and 15, a lever guide 118 for guiding the shift lever 103 has a lock guide 123 extending along the lever guide 118 and including a plurality of engaging recesses 123a. The shift lever 103 includes a hook 124 pivotable about an axis P2 defined by the shift lever 103, a spring 131 for urging the hook 124 toward the recesses 123a of the lock guide 123, and a control button 132 and control rod 133 for separating the hook 124 from the recesses 123a.

According to the above structure, when the shift lever 103 is operated forward from neutral position N, the hook 124 automatically engages one of the recesses 123a of the lock guide 123 to maintain the shift lever 103 in a selected forward speed position. The tractor will then run at a constant speed corresponding to this position. The shift lever 103 may be returned to the neutral position N by pressing the control button 132 to separate the hook 124 from the lock guide 123.

Next, description will be made of a structure for interlocking the shift lever 103 to the HST 6 when the shift lever 103 is in a forward speed position, and breaking the interlock when the shift lever 103 is in the neutral position N. A seesaw arm 134 is supported to be pivotable about the axis P2 as shown in FIGS. 12 through 14, and placed in contact with a guide 123b opposite from the lock guide 123 as shown in FIG. 15. On the other hand, the engaging pin 113 of the interlocking plate 105 is urged downward by a spring 135. A wire 137 extends between and interconnects a bracket 136a of the engaging pin 113 and the seesaw arm 134.

According to the above structure, when the shift lever 103 is operated to the neutral position N, the seesaw arm 134 is swung counterclockwise in FIG. 13, pulling the wire 137 to raise the engaging pin 113. In this state, the engaging pin 113 is out of contact with the engaging projection 126a, whereby the HST 6 is freely controllable through the forward and backward change speed pedals 9 and 10 to provide forward and backward speeds.

When the shift lever 103 is operated forward from the neutral position N, the seesaw arm 134 is swung clockwise in FIG. 13 (to the position shown in FIG. 13) by the action of the guide 123b, whereby the engaging pin 113 projects downward. As a result, the engaging pin 113 and engaging projection 126a contact each other to operate the HST 6 for acceleration with the forward operation of the shift lever 103. Even if the driver releases the shift lever 103 in a desired speed position, the shift lever 103 is retained in that position by the action of the lock guide 123. Consequently, the tractor will run at a constant speed corresponding to the position of the shift lever 103. When the driver depresses the forward change speed pedal 9, the engaging pin 113 and engaging projection 126a become disengaged. As a result, the interlocking arm 126 moves away from the interlocking plate 105 to enable acceleration from the above constant speed. Once the driver's foot is removed from the forward change speed pedal 9, the interlocking arm 126 moves back to the interlocking plate 105 to reinstate the above constant speed.

When the backward change speed pedal 10 is depressed hard during the constant speed run with the shift lever 103 maintained in a selected position, the interlocking arm 126, and thus the bracket arm 107, pivot clockwise in FIG. 12, whereby the engaging pin 113 moves away from the engaging projection 126a. This structure allows the HST 6 to be operated to neutral, as necessary, while the shift lever 103 is maintained in a selected forward speed position.

The side brakes 19 and engaging pin 113 are interlocked through the wire 38. This interlocking relationship is the same as that between the side brakes 19 and lock plate 40 in the preceding embodiment, and therefore will not be described here. Assume that one of the brake pedals 20 is depressed for the tractor to make a small, sharp turn, for example, while running at a constant speed with the shift lever 103 maintained in a selected forward speed position. In this case, the control element 25 is not pushed and the engaging pin 113 in FIGS. 12 and 14 is not moved upward, thereby maintaining the constant speed condition.

Assume now that both of the brake pedals 20 and 21 are depressed at the same time to stop the tractor, for example. In this case, the control element 25 is pushed to pull the wire 38. As a result, the engaging pin 113 is moved upward away from the engaging projection 126a. Then, the swash plate 6a of HST 6 returns to the neutral position under the force urging the control arm 12 to neutral as shown in FIG. 2. The interlocking arm 126 moves leftward away from the interlocking plate 105 as shown in a two-dot-and-dash line in FIG. 12. Thus, when the right and left brake pedals 20 and 21 are both depressed, the HST 6 returns to the neutral position but the shift lever 103 remains in the same position retained by the lock guide 123.

For reinstating the previous constant speed after depressing both the right and left brake pedals 20 and 21, the driver may depress the forward change speed pedal 9 forward from the neutral position. Then, the interlocking arm 126 lying in the leftward position shown in the two-dot-and-dash line in FIG. 12 away from the interlocking plate 105 is operated rightward toward the interlocking plate 105. When the engaging projection 126a of the interlocking arm 126 contacts the engaging pin 113 of the interlocking plate 105, the engaging pin 113 is pushed upward. The engaging pin 113 projects downward again after passage of the engaging projection 126a.

When the forward change speed pedal 9 is released in this state, the engaging projection 126a contacts the engaging pin 113, whereby the forward change speed pedal 9 and the swash plate 6a of HST 6 are set to the position corresponding to the previous constant speed (the speed corresponding to the position of the shift lever 103), to reinstate the previous constant speed run.

An HST is employed as the stepless transmission in the two embodiments described above. However, it is possible to employ a different type of transmission such as a belt type stepless transmission.

What is claimed is:

1. A speed control system for a vehicle having a braking device and a stepless transmission, comprising:
 a change speed member mounted in said stepless transmission to be shiftable between a forward drive zone and a backward drive zone across a neutral position;
 neutralizing means for urging said change speed member to said neutral position;
 a change speed pedal operatively connected to said change speed member;
 a shift lever shiftable between a first shift position and a second shift position for adjusting a vehicle speed and lockable to any selected shift position for a cruising run at a speed corresponding to said selected position; and
 interlocking means for operatively interconnecting said change speed member and said shift lever, said interlocking means including:
 a first interlocking member connected to said change speed member,
 a second interlocking member connected to said shift lever and maintaining a position corresponding to said selected shift position of said shift lever,
 connecting means having a connecting member operatively connected to said braking device, said connecting member being shiftable between a connection enable position for enabling connection between said first interlocking member and said second interlocking member and a connection prohibit position for disconnecting the connection between said first interlocking member and said second interlocking member, said connecting member being shifted to said connection prohibit position in response to operation of said braking device.

2. A speed control system as claimed in claim 1, further comprising a control member operable to prohibit the return to said connection enable position of said connecting member.

3. A speed control system as claimed in claim 2, wherein said control member is selectively switchable between a first position to prohibit the return to said connection enable position of said connecting member and a second position to permit the return to said connection enable position of said connecting member.

4. A speed control system as claimed in claim 3, wherein said control member is operable to set said connecting member to said connection prohibit position when in said first position, and to set said connecting member to said connection enable position when in said second position.

5. A speed control system as claimed in claim 3, wherein said control member is disposed adjacent said shift lever.

6. A speed control system as claimed in claim 4, wherein said braking device is operable through said control member to switch the position of said connecting member.

7. A speed control system as claimed in claim 1, wherein said braking device includes a right brake for braking a right wheel, and a left brake for braking a left wheel, said right and left brakes being operable independently of each other, said connecting member being movable to said connection prohibit position only when said right and left brakes are operated simultaneously.

8. A speed control system as claimed in claim 1, wherein said first shift position of said shift lever corresponds to the neutral position of said stepless transmission, and said second shift position corresponds to a high forward speed position of said stepless transmission.

9. A speed control system as claimed in claim 1, wherein said interlocking means further includes an auto return means for automatically returning said connecting member to said connection enable position after the operation of said braking device.

10. A speed control system for a vehicle having a braking device and a stepless transmission, comprising:
a change speed member mounted in said stepless transmission to be shiftable between a forward drive zone and a backward drive zone across a neutral position;
neutralizing means for urging said change speed member to said neutral position;
a change speed pedal operatively connected to said change speed member;
a shift lever shiftable between a first shift position and a second shift position and lockable to a selected shift position; and
interlocking means for operatively interconnecting said change speed member and said shift lever, said interlocking means including:
a first interlocking member connected to said change speed member,
a second interlocking member connected to said shift lever and maintaining a position corresponding to said selected shift position of said shift lever,
connecting means operatively connected to said braking device, having a connection enable state for enabling connection between said first interlocking member and said second interlocking member, and a connection prohibit state for prohibiting the connection between said first interlocking member and said second interlocking member, said connecting means being movable to said connection prohibit state with operation of said braking device, and
auto return means for automatically returning said connection means to said connection enable state after the operation of said braking device;
said first interlocking member, when disconnected from said second interlocking member, being connectable to said second interlocking member by shifting of said change speed pedal,
wherein said braking device includes a right brake for braking a right wheel, and a left brake for braking a left wheel, said right and left brakes being operable independently of each other, said connecting means being movable to said connection prohibit state only when said right and left brakes are operated simultaneously.

11. A speed control system for a vehicle having a braking device and a stepless transmission, comprising:
a change speed member mounted in said stepless transmission to be shiftable between a forward drive zone and a backward drive zone across a neutral position;
neutralizing means for urging said speed change member to said neutral position;
a change speed pedal operatively connected to said change speed member;
a shift lever shiftable between a first shift position and a second shift position for adjusting a vehicle speed and lockable to any selected shift position for a cruising run; and
interlocking means for operatively interconnecting said change speed member and said shift lever, said interlocking means including:
a first interlocking member connected to said change speed member,
a second interlocking member connected to said shift lever and maintaining a position corresponding to said selected shift position of said shift lever,
connecting means having a connecting member operatively connected to said braking device, said connecting member being shiftable between a connection enable position enabling connection between said first interlocking member and said second interlocking member and a connection prohibit position for disconnecting the connection between said first interlocking member and said second interlocking member, said connecting member being shifted to said connection prohibit position in response to an operation of said braking device;
auto return means for automatically returning said connecting member to said connection enable position after the operation of said braking device;
said first interlocking member, when disconnected from said second interlocking member, being connectable to said second interlocking member by shifting of said change speed pedal.

12. A speed control system as claimed in claim 11, further comprising a control member operable to prohibit the return to said connection enable position of said connecting member by said auto return means.

13. A speed control system as claimed in claim 12, wherein said control member is selectably switchable between a first position to prohibit the return to said connection enable position of said connecting member and a second position to permit the return to said connection enable position of said connecting member.

14. A speed control system as claimed in claim 11, wherein said braking device includes a right brake for braking a right wheel and a left brake for braking a left wheel, and said right and left brakes being operable independently of each other, said connecting member being shifted to said connection prohibit position only when said right and left brakes are operated simultaneously.

* * * * *